(12) United States Patent
Guan et al.

(10) Patent No.: US 6,493,560 B1
(45) Date of Patent: Dec. 10, 2002

(54) METHOD AND SYSTEM FOR CHANGING STATES IN A WIRELESS TELECOMMUNICATION SYSTEM

(75) Inventors: Sheng Guan, Austin, TX (US); Olaf Dicker, Austin, TX (US); Elie Jreij, Pflugerville, TX (US); Jim S. Umstetter, Round Rock, TX (US)

(73) Assignee: Siemens Information & Communication Mobile, LLC, San Diego, CA (US)

( * ) Notice: Subject to any disclaimer, the term of this patent is extended or adjusted under 35 U.S.C. 154(b) by 0 days.

(21) Appl. No.: 09/444,008

(22) Filed: Nov. 19, 1999

(51) Int. Cl.⁷ .............................................. H04B 15/00
(52) U.S. Cl. ...................... 455/502; 455/465; 370/503; 370/331
(58) Field of Search ................. 455/426, 437, 455/502, 405; 370/503, 331, 345, 498, 280

(56) References Cited

U.S. PATENT DOCUMENTS

| | | | | |
|---|---|---|---|---|
| 5,280,541 A | * | 1/1994 | Marko et al. | 455/462 |
| 5,416,779 A | * | 5/1995 | Barnes et al. | 370/280 |
| 5,748,621 A | * | 5/1998 | Masuda et al. | 370/337 |
| 5,784,368 A | * | 7/1998 | Weigand et al. | 370/350 |
| 5,787,078 A | * | 7/1998 | Geywitz et al. | 370/331 |
| 5,915,216 A | * | 6/1999 | Lysejko | 455/422 |
| 6,167,281 A | * | 12/2000 | Sugi | 455/502 |
| 6,381,231 B1 | * | 4/2002 | Silventoinen et al. | 370/332 |

* cited by examiner

*Primary Examiner*—Daniel Hunter
*Assistant Examiner*—Andrew T. Harry

(57) ABSTRACT

A method is provided for wireless communication. The method includes communicating from a first unit to a second unit a plurality of transition signals. Each of the transition signals has a sequential value. The method further includes transitioning the first unit and the second unit from a first state to a second state simultaneously based on the sequential values of the transition signals.

16 Claims, 3 Drawing Sheets

METHOD AND SYSTEM FOR CHANGING STATES IN A WIRELESS TELECOMMUNICATION SYSTEM

RELATED APPLICATIONS

This application is related to the following co-pending Applications all filed on Nov. 19, 1999:

Ser. No. 09/443,166, entitled System and Method for Wireless Communication Incorporating Error Concealment;

Ser. No. 09/443,999, entitled System and Method for Simultaneously Testing Multiple Cordless Telephones;

Ser. No. 09/148,991, entitled System and Method for Testing An Assembled Telephone;

Ser. No. 09/239,414, entitled System and Method for Wireless Communication Incorporating Range Warning;

Ser. No. 09/444,028, entitled Method and System for Wireless Telecommunication Between A Mobile Unit and A Base Unit;

Ser. No. 08/747,468, entitled Method and System for Avoiding Periodic Bursts of Interference In Wireless Communication Between A Mobile Unit and A Base Unit;

Ser. No. 09/884,415, entitled Method and System for Power-Conserving Interference Avoidance in Communication Between A Mobile Unit and A Base Unit In A Wireless Telecommunication System;

Ser. No. 09/443,933, entitled Method and System for Wireless Communication Incorporating Distinct System Identifier Bytes to Preserve Multi-frame Synchronization for Systems with Limited Control Channel Bandwidth;

Ser. No. 09/443,972, entitled System and Method for Wireless Communication Incorporating Synchronization Concept for 2.4 Ghz Direct Sequence Spread Spectrum Cordless Telephone System;

Ser. No. 09/443,166, entitled System And Method For Wireless Communication Incorporating Overloading Prevention Techniques for Multi-frame-synchronized Systems;

Ser. No. 09/443,998, entitled System and Method for Wireless Communication Incorporating Preloaded Response Message;

Ser. No. 09/443,972, entitled Method and System for a Wireless Communication System Incorporating Channel Selection Algorithm for 2.4 Ghz Direct Sequence Spread Spectrum Cordless Telephone System;

Ser. No. 08/558,665, entitled Method and System for Transmitting and Receiving Caller Id Data in a Wireless Telephone System;

Ser. No. 09/443,937, entitled Method and System for Prioritization of Control Messages In A Wireless Telephone System;

Ser. No. 09/443,996, entitled Method and System for Wireless Telecommunications Using a Multiframe Control Message;

Ser. No. 09/021,643, entitled Method and System for Transmitting Caller Id Information from a Base Station to a Mobile Unit Outside the Context of an Incoming Call; and Ser. No. 09/443,942, entitled Method and System for Data Compression.

TECHNICAL FIELD OF THE INVENTION

This invention relates generally to the field of telecommunications and, more specifically, to a method and system for changing states in a wireless telecommunication system.

BACKGROUND OF THE INVENTION

As society grows more complex and operates at an ever accelerating pace, there has been a growing need for better and more flexible communication devices. One area that has experienced substantial development activity is the area of wireless communication. Wireless telephone systems are also known as portable, cordless or mobile telephone systems. A typical wireless communication system has a base station located at a customer's or user's premises. The base is connected to the Public Switched Telephone Network (PSTN) over a wireline interface and communicates with a mobile unit or handset over an air interface that permits the user to communicate remotely from the base station. While users desire the freedom and flexibility afforded by mobile wireless communications systems, they typically do not want to sacrifice the numerous features, such as caller ID, that are available through the wireline service over the PSTN. In addition, users of wireless systems increasingly demand a voice quality that is as good as the voice quality available over a wireline link.

In the past, the enhanced features and high voice quality demanded by users have been achieved by the use of sophisticated and complex algorithms and methods that require substantial processor resources and large amounts of memory. These processing and memory resources are not only expensive but also place a substantial drain on battery power, therefore shortening the effective use of the mobile unit. Other technical problems associated with the need for using faster and more powerful processors include larger packaging to accommodate the larger-sized components and to dissipate the heat generated by such units. In the past, wireless systems have been large and bulky and have weighed more than what is satisfactory to many users.

While wireless communication devices and methods have provided an improvement over prior approaches in terms of features, voice quality, cost, packaging size and weight, the challenges in the field of wireless telecommunications have continued to increase with demands for more and better techniques having greater flexibility and adaptability.

Therefore, a need has arisen for a new method and system for changing states in a wireless telecommunication system.

SUMMARY OF THE INVENTION

In accordance with the present invention, a method and system for changing states in a wireless telecommunication system are provided that substantially eliminate or reduce disadvantages and problems associated with previously developed systems and methods.

A method for wireless communication is disclosed. The method includes communicating from a first unit to a second unit a plurality of transition signals. Each of the transition signals has a sequential value. The method further includes transitioning the first unit and the second unit from a first state to a second state simultaneously based on the sequential values of the transition signals.

Technical advantages of the present invention include providing an improved method for transitioning units in a telecommunication system between states. In particular, a first unit communicates a plurality of transition signals to a second unit that have sequential values. The first unit transitions from a first state to a second state after transmitting the transition signal with a final value. Accordingly, the second unit may determine at what point the first unit will transition between states if any one of the plurality of transition signals is received. As a result, the units may transition from the first state to the second state simultaneously.

Other technical advantages of the present invention will be readily apparent to one skilled in the art from the following figures, descriptions and claims.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiment of the present invention and its advantages are best understood by referring to FIGS. 1 through 6 of the drawings, like numerals being used for like and corresponding parts of the various drawings.

Figure 1:
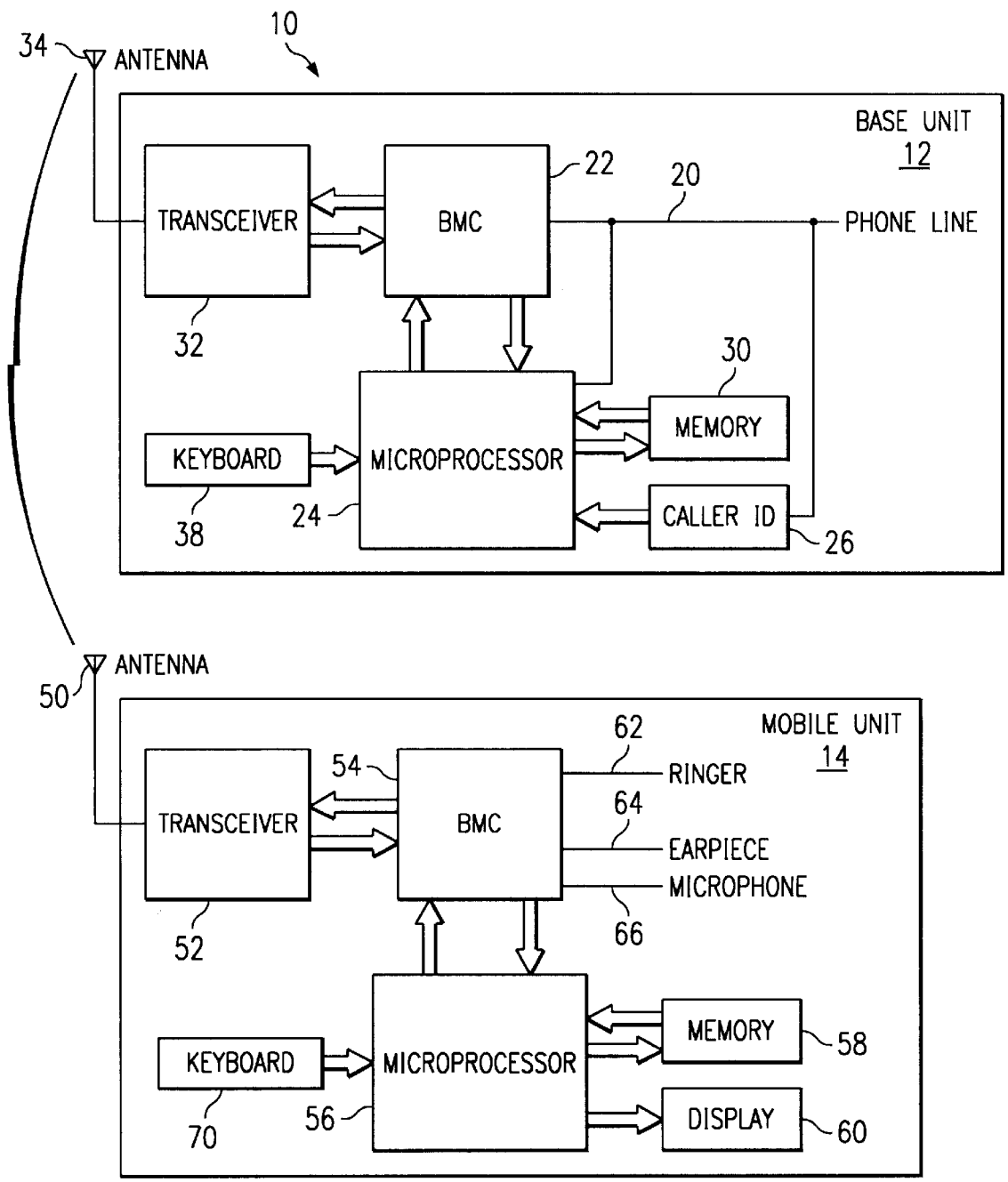
FIG. 1 is a block diagram illustrating a wireless telecommunication system including a base unit and a mobile unit constructed in accordance with the teachings of the present invention.

FIG. 1 is a block diagram illustrating a telecommunication system 10 including a base unit 12 and a mobile unit 14. The base unit 12 and the mobile unit 14 communicate with each other at a frequency in the industrial/scientific/medical (ISM) band. For example, the units 12 and 14 may communicate in the range of 2400 to 2483.5 MHz. It will be understood, however, that the base unit 12 and the mobile unit 14 may communicate with each other at other suitable frequencies without departing from the scope of the present invention.

The telecommunication system 10 illustrated in FIG. 1 is a wireless or cordless telephone system. In this exemplary embodiment, the mobile unit 14 comprises a mobile handset that communicates with the base unit 12 over discreet radio frequency channels. Although the telecommunication system 10 is illustrated as a cordless telephone system, it will be understood that the telecommunication system 10 may comprise any suitable type of wireless communication system. For example, the telecommunication system 10 may comprise a cellular telephone system, Local Multiple Distribution Service, and the like, without departing from the scope of the present invention.

In accordance with the exemplary embodiment shown in FIG. 1, the base unit 12 comprises a phone line 20 that is coupled to the Public Switched Telephone Network over a landline for receiving and transmitting voice or other data. For an incoming telephone call, data from the phone line 20 is passed to a microprocessor 24 and a caller ID interface 26. The caller ID interface 26 extracts caller ID information, such as a name and a telephone number associated with the originator of the telephone call, from the data on the phone line 20 and passes it to the microprocessor 24. The microprocessor 24 communicates with an internal memory 30 while processing the data received from the phone line 20 and the caller ID interface 26.

The microprocessor 24 then communicates the processed data from the phone line 20 and the caller ID interface 26, along with any additional data that needs to be transmitted to the mobile unit 14, to a burst mode controller (BMC) 22. The BMC 22 also receives data directly from the phone line 20, which is processed along with the data from the microprocessor 24. For example, the BMC 22 packages voice data from the phone line 20 with additional data from the microprocessor 24 into one frame structure. The BMC 22 also communicates the data to a transceiver 32 which transmits a signal through an antenna 34 to the mobile unit 14. The base unit 12 also comprises a keyboard 38 for inputting data to the microprocessor 24. The keyboard 38 may comprise a numeric keypad for entering a telephone number or other data. The keyboard 38 may also comprise a pager button for paging the mobile unit 14 such that the mobile unit 14 provides a sound for locating the mobile unit 14.

The mobile unit 14 receives the signal from the base unit 12 through an antenna 50 which passes the data to a transceiver 52. The transceiver 52 processes the data and it to a BMC 54, which unpackages the data and communicates with a microprocessor 56. The microprocessor 56 communicates with an internal memory 58 and sends data to a display 60, such as an LCD or LED. For example, the microprocessor 56 may send to the display 60 a name and a telephone number extracted by the caller ID interface 26 in the base unit 12.

The BMC 54 also sends a signal to a ringer 62 to notify a user of an incoming call. After the user responds by activating the mobile unit 14, the BMC 54 sends the voice data received from the base unit 12 to an earpiece 64. After the connection is completed, voice data for transmission to the phone line 20 through the base unit 12 is received by the BMC 54 from the microphone 66. This data is transmitted from the mobile unit 14 to the base unit 12 in a similar manner to the transmission of data from the phone line 20 to the earpiece 64. The mobile unit 14 also comprises a keyboard 70 for a user to enter information for communication to the microprocessor 56. This keyboard 70 may be, for example, a numeric keypad on a mobile telephone handset for entering a telephone number.

The same process is also used for an outgoing telephone call, beginning with the activation of the mobile unit 14, which sends a signal through the BMC 54 to the transceiver 52 and from the transceiver 52 to the antenna 50. From the antenna 50 of the mobile unit 14 the signal is transmitted to the antenna 34 of the base unit 12, which passes the signal to the transceiver 32. The transceiver 32 passes the signal through the BMC 22 to the phone line 20. The telephone number being called, voice and other data is then communicated back and forth between the mobile unit 14 and the base unit 12 as previously described.

The microprocessors 24 and 56 each comprise an air interface that includes an interface protocol for interfacing the base unit 12 and the mobile unit 14. The interface protocol includes a plurality of consecutive frames for providing communication between the base unit 12 and the mobile unit 14, as described in more detail below in connection with FIGS. 2 and 3.

Figure 2:
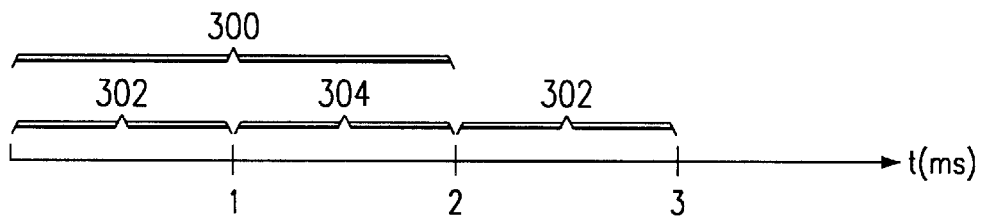
FIG. 2 is a timeline illustrating the length of a frame for communication between the mobile unit and the base unit of FIG. 1, including a master sub-frame for transmission from the mobile unit and a slave sub-frame for transmission from the base unit, in accordance with one embodiment of the present invention.

FIG. 2 is a timeline illustrating the length of a frame 300 in accordance with one embodiment of the present invention. According to this embodiment, the frame 300 has a frame length of two milliseconds. This two-millisecond frame 300 is sub-divided into a one-millisecond master sub-frame 302 and a one-millisecond slave sub-frame 304. The master sub-frame 302 is that portion of the frame 300 during which the mobile unit 14 transmits a signal to the base unit 12 and the base unit 12 receives the signal from the mobile unit 14. Similarly, the slave sub-frame 304 is that part of the frame 300 during which the base unit 12 transmits a signal to the mobile unit 14 and the mobile unit 14 receives the signal from the base unit 12.

According to the embodiment shown in FIG. 2, each frame 300 is followed by a consecutive frame 300 such that a plurality of consecutive frames 300 provides alternating master sub-frames 302 and slave sub-frames 304. Thus, during active communication between the base unit 12 and the mobile unit 14, each master sub-frame 302 is followed by a slave sub-frame 304 which is followed by another master sub-frame 302 and so on. These alternating sub-frames 302 and 304 continue indefinitely while the base unit 12 and the mobile unit 14 are actively communicating.

Figure 3:
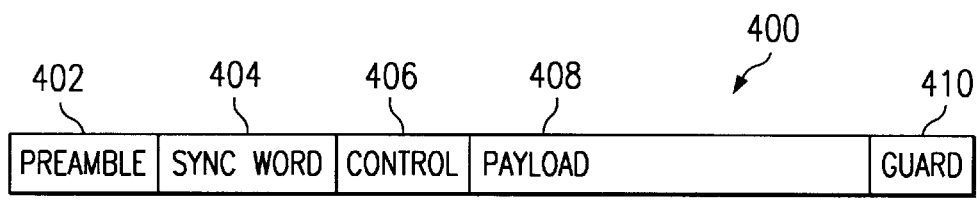
FIG. 3 illustrates one embodiment of a frame structure for the master sub-frame and the slave sub-frame of FIG. 2.

FIG. 3 illustrates one embodiment of a frame structure 400 for the master sub-frame 302 and/or the slave sub-frame 304. The frame structure 400 comprises a preamble field 402, a synchronization word (syncword) 404, a control channel 406, a payload channel 408, and a guard field 410. According to one embodiment, the preamble field 402 includes 16 bits of preamble information. The syncword 404 includes an eight-bit synchronization word for synchronizing the units 12 and 14. The control channel 406 includes eight bits of control data, which is a message from one unit 12 or 14 to the other unit 12 or 14. The payload channel 408 generally includes 64 bits of payload data, such as voice data. However, the payload channel 408 may also be used to communicate additional control data while the base unit 12 and the mobile unit 14 are not actively communicating payload data to each other. This allows faster communication of control data between the units 12 and 14. The guard field 410 includes four bits of guard data to ensure that there is no overlap between a master sub-frame 302 and a slave sub-frame 304.

Due to bandwidth limitations, the control channel 406 includes only one byte, or eight bits, of data for each sub-frame 302 and 304 in the exemplary embodiment. However, more than one byte of control data may be necessary to exchange complete control messages between the mobile unit 14 and the base unit 12. Therefore, the mobile unit 14 and the base unit 12 communicate control data using multi-frame messages.

A multi-frame message allows a control message made up of multiple bytes to be communicated between the mobile unit 14 and the base unit 12. For example, according to one embodiment, a multi-frame message comprises eight bytes of data that are communicated in eight one-byte control channels 406 of eight sub-frames 302 or 304. Thus, a multi-frame control message is received one byte at a time over eight sub-frames 302 or 304. It will be understood that the length of the control message may be made shorter or longer by changing the number of sub-frames 302 and 304 that are used to communicate the complete message.

In accordance with the exemplary embodiment, both the base unit 12 and the mobile unit 14 comprise frame counters that are initialized to zero. As each sub-frame 302 or 304 is received, the frame counters are incremented. These frame counters are used to maintain synchronization between the mobile unit 14 and the base unit 12. Thus, no sequencing information need be transmitted with the control data. According to the embodiment in which each multi-frame message includes eight bytes of data, the frame counters are each incremented modulo 8. In other words, each frame counter sequentially cycles through the integer series 0 to 7.

Figure 4:
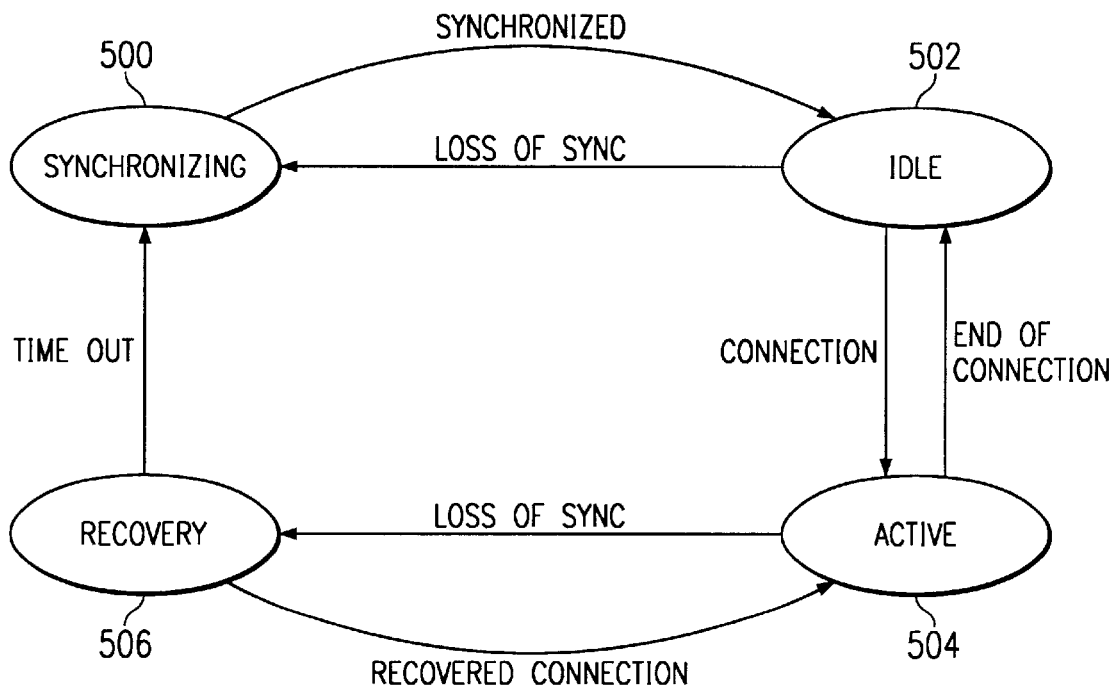
FIG. 4 is a state diagram illustrating transitioning between states for the base unit and the mobile unit of FIG. 1 in accordance with one embodiment of the present invention.

FIG. 4 is a state diagram illustrating transitioning between states for the base unit 12 and the mobile unit 14 in accordance with one embodiment of the present invention. The units 12 and 14 may be in one of four states. These four states include a synchronizing state 500, an idle state 502, an active state 504, and a recovery state 506. The recovery state 506 may be considered to be part of the active state 504.

In the synchronizing state 500, the units 12 and 14 negotiate various communication parameters necessary for proper communication. In the idle state 502, the base unit 12 is synchronized with the mobile unit 14; however, payload data is not actively communicated between the units 12 and 14. While in the idle state 502, one frame 300 is communicated between the units 12 and 14 approximately every second in order to maintain synchronization while conserving power in the mobile unit 14. It will be understood that the amount of time between each communicated frame 300 in the idle state 502 may be any other suitable amount of time without departing from the scope of the present invention.

As previously described in connection with FIG. 3, the payload channel 408 of the frame structure 400 includes additional control data as opposed to actual payload data while the units 12 and 14 are in either the synchronizing state 500 or the idle state 502.

In the active state 504, the units 12 and 14 actively communicate payload data, such as voice data, with each other through the payload channel 408. While in the active state 504, approximately 500 frames 300 are communicated between the units 12 and 14 each second in the exemplary embodiment. In the recovery state 506, a unit 12 or 14 attempts to recover from a loss of synchronization that has occurred while in the active state 504.

As shown in FIG. 4, the units 12 and 14 transition from the synchronizing state 500 to the idle state 502 after the base unit 12 is synchronized to the mobile unit 14. If synchronization is lost, the units 12 and 14 transition back from the idle state 502 to the synchronizing state 500. From the idle state 502, the units 12 and 14 transition to the active state 504 when a connection is made. After the connection is terminated, the units 12 and 14 transition back from the active state 504 to the idle state 502. However, if a unit 12 or 14 loses connection while in the active state 504, the unit 12 or 14 transitions to the recovery state 506 where it attempts to recover the connection and return to the active state 504. If the connection is not recovered before a specified amount of time has passed, the unit 12 or 14 returns to the synchronizing state 500.

At initialization, the base unit 12 and the mobile unit 14 begin at the synchronizing state 500. Also, after unrecoverable failure of either unit 12 or 14 from another state 502, 504 or 506, the failing unit 12 or 14 arrives at the synchronizing state 500 which causes the other unit 14 or 12 to also transition to the synchronizing state 500.

Figure 5:
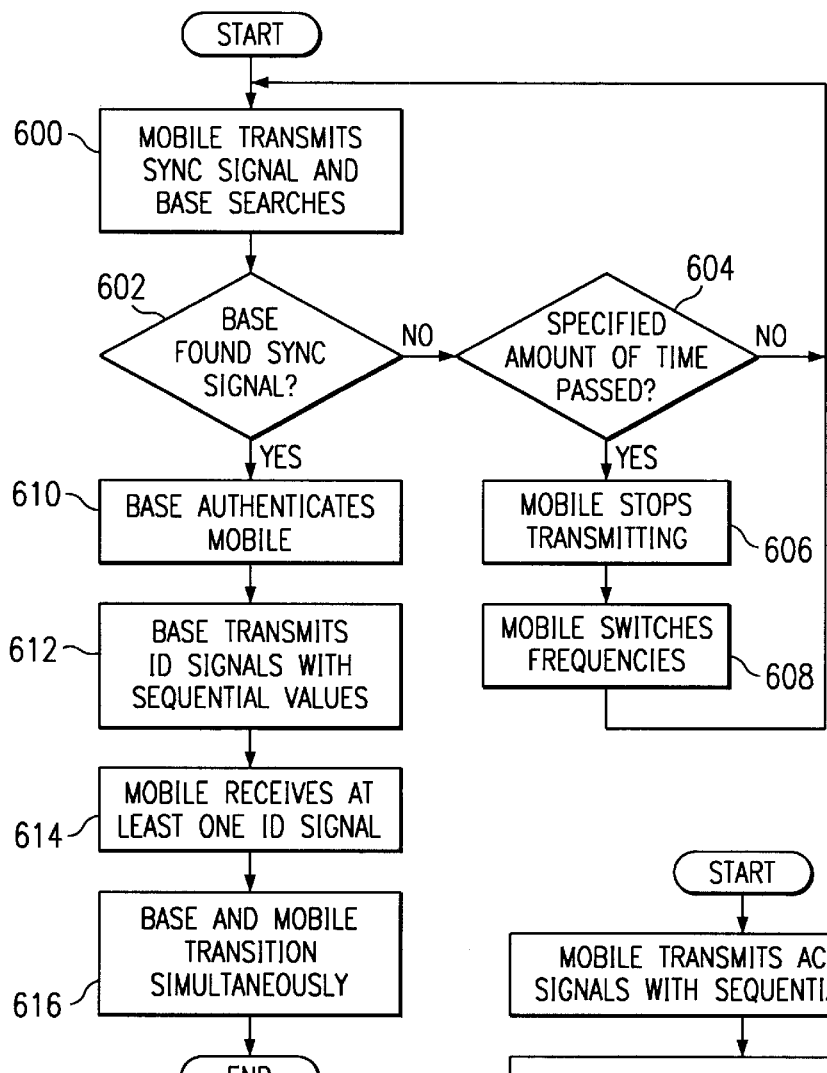
FIG. 5 is a flow diagram illustrating one embodiment of a method for transitioning the base unit and the mobile unit of FIG. 1 from the synchronizing state of FIG. 4 to the idle state of FIG. 4.

FIG. 5 is a flow diagram illustrating one embodiment of a method for transitioning the base unit 12 and the mobile unit 14 from the synchronizing state 500 to the idle state 502. The method begins at step 600 where the mobile unit 14 continuously transmits a synchronization signal on a specific frequency for a specified amount of time that allows the base unit 12 to search each possible communication frequency in order to find the synchronization signal. According to an exemplary embodiment, the mobile unit 14 transmits the synchronization signal for approximately 360 milliseconds while the base unit 12 searches through 52 frequency channels for approximately six milliseconds per channel.

In decisional step 602, a determination is made as to whether the base unit 12 has found the synchronization signal. If the base unit 12 has not found the synchronization signal, the method follows the No branch from decisional step 602 to decisional step 604 where a determination is made as to whether the specified amount of time has passed without the base unit 12 finding the synchronization signal. If the specified amount of time has passed, the method follows the Yes branch from decisional step 604 to step 606 where the mobile unit 14 stops transmitting for another specified amount of time. According to the exemplary embodiment, the mobile unit 14 stops transmitting the synchronization signal for approximately 640 milliseconds. At step 608, the mobile unit 14 switches to a different frequency for transmitting the synchronization signal. The method then returns to step 600 where the mobile unit 14 transmits the synchronization signal at the different frequency while the base unit 12 searches.

Returning to decisional step 604, if the specified amount of time has passed without the base unit 12 synchronizing to the mobile unit 14, the method follows the No branch from decisional step 604 back to step 600 where the mobile unit 14 continues to transmit the synchronization signal at the same frequency.

Returning to decisional step 602, if the base unit 12 finds the synchronization signal, the method follows the Yes branch from decisional step 602 to step 610 where the base unit 12 interprets the synchronization signal for a mobile unit identifier to authenticate that the signal was transmitted by the mobile unit 14. After this authentication, the method proceeds to step 612 where the base unit 12 transmits to the mobile unit 14 a plurality of identification signals that include sequential values. For example, according to an exemplary embodiment, the base unit 12 transmits in a sequential fashion ten identification signals with values between 0 and 9. It will be understood, however, that any other suitable number of identification signals with any other suitable values or characters may be used without departing from the scope of the present invention.

At step 614, the mobile unit 14 receives at least one of the identification signals transmitted by the base unit 12. At step 616, the base unit 12 and the mobile unit 14 transition from the synchronizing state 500 to the idle state 502 simultaneously. Transitioning from one state to another simultaneously means that the frame counters for each unit 12 and 14 are set to the same value at essentially the same time and that the units 12 and 14 begin communicating with each other in accordance with the appropriate state at that same time. Thus, the frame counters for both units 12 and 14 will have the same values at the same times as the frame counters both sequentially cycle through the integer series 0 to 7. This allows multi-frame control messages to be properly communicated between the units 12 and 14. According to the embodiment described above in connection with FIG. 3, the frame counters for both units 12 and 14 are set to zero at the same time when the simultaneous transition occurs.

Simultaneous transition is possible due to the fact that the base unit 12 transitions to the idle state 502 after transmitting the last identification signal. Thus, if the mobile unit 14 received any one of the identification signals in step 614, the mobile unit 14 can determine from the sequential value of the received identification signal the remaining number of slave sub-frames 304 that the base unit 12 will transmit before transitioning to the idle state 502. In this way, if even one of the identification signals is received by the mobile unit 14 in step 614, the base unit 12 and the mobile unit 14 will transition from the synchronizing state 500 to the idle state 502 simultaneously in step 616.

In the unlikely event that the mobile unit 14 fails to receive one of the identification signals, the mobile unit 14 will remain in the synchronizing state 500. This will cause the base unit 12 to revert back to the synchronizing state 500 and the method may begin again at step 600.

While in the idle state 502, the mobile unit 14 sends a ping message at specified intervals, such as every second. In response to each ping message, the base unit 12 sends a pong message. The ping message may inquire of the base unit 12 whether a connection is requested by the base unit 12, or the ping message may initiate a connection. If no connection is requested by the base unit 12 in response to a ping message inquiry, both units 12 and 14 remain in the idle state 502 exchanging ping and pong messages. However, if a connection is requested by the base unit 12 with a pong message or if the mobile unit 14 initiates a connection with a ping message, the base unit 12 and the mobile unit 14 transition to the active state 504.

Figure 6:
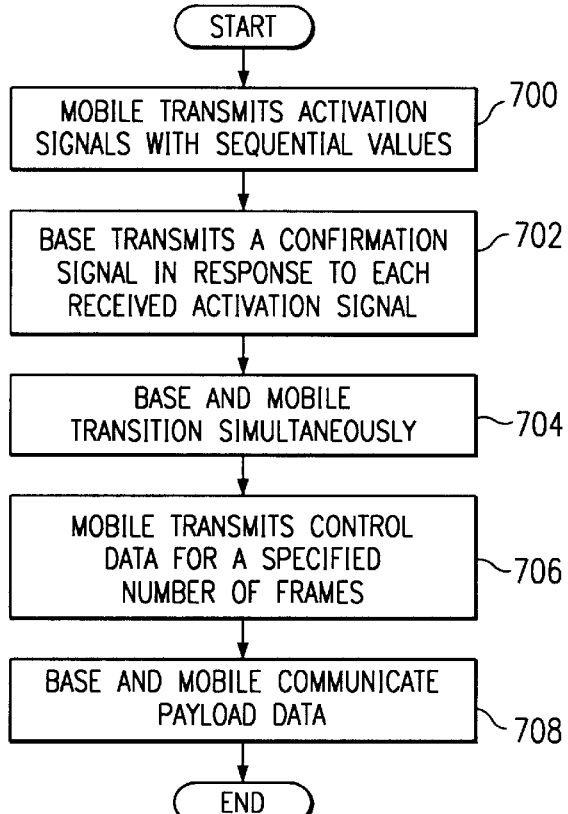
FIG. 6 is a flow diagram illustrating one embodiment of a method for transitioning the base unit and the mobile unit of FIG. 1 from the idle state of FIG. 4 to the active state of FIG. 4.

FIG. 6 is a flow diagram illustrating one embodiment of a method for transitioning the base unit 12 and the mobile unit 14 from the idle state 502 to the active state 504. The method begins at step 700 where the mobile unit 14 transmits to the base unit 12 a plurality of activation signals with sequential values for signaling to the base unit 12 that a transition to the active state 504 is about to occur. For example, according to an exemplary embodiment, the mobile unit 14 transmits in a sequential fashion ten activation signals with values between 0 and 9. It will be understood, however, that any other suitable number of activation signals with any other suitable values or characters may be used without departing from the scope of the present invention.

In response to each activation signal received by the base unit 12, the base unit 12 transmits a confirmation signal to the mobile unit 14 in step 702. At step 704, the base unit 12 and the mobile unit 14 transition from the idle state 502 to the active state 504 simultaneously. This is possible due to the fact that the mobile unit 14 transitions to the active state 504 after transmitting the last activation signal.

Thus, if the base unit 12 received any one of the activation signals transmitted by the mobile unit 14 in step 700, the base unit 12 can determine from the sequential value of the received activation signal the remaining number of master sub-frames 302 that the mobile unit 14 will transmit before transitioning to the active state 504. In this way, if even one of the activation signals is received by the base unit 12, the base unit 12 and the mobile unit 14 will transition from the idle state 502 to the active state 504 simultaneously in step 704.

In the unlikely event that the base unit 12 fails to receive one of the activation signals, the mobile unit 14 will transition to the synchronizing state 500 after not receiving a confirmation signal from the base unit 12. This will cause the base unit 12 to transition to the synchronizing state 500 so that the units 12 and 14 may re-synchronize.

After transitioning to the active state 504 in step 704, the mobile unit 14 continues to transmit control data in the payload channel 408 for a specified number of frames 300 in step 706. According to the exemplary embodiment, the number of frames 300 transmitted with additional control data is eight. The control data includes identifying information for the mobile unit 14 and serves as a confirmation to the base unit 12 that the mobile unit 14 received one of the confirmation signals from the base unit 12. For the exemplary embodiment, both units 12 and 14 actively communicate payload data to each other through the payload channel beginning with the ninth frame 300 in step 708.

Thus, in the unlikely event that the mobile unit 14 fails to receive one of the confirmation signals from the base unit 12, the mobile unit 14 will transition to the synchronizing state 500. The base unit 12 will determine that this has occurred by interpreting the data received in the first eight frames 300 after the transition should have taken place. Thus, the base unit 12 will also transition to the synchronizing state 500 so that the units 12 and 14 may re-synchronize.

To transition from the active state 504 to the idle state 502, the mobile unit 14 transmits a plurality of deactivation signals similar to the activation signals transmitted for transitioning from the idle state 502 to the active state 504. According to an exemplary embodiment, the mobile unit 14 transmits in a sequential fashion five deactivation signals with values between 0 and 4. It will be understood, however, that any other suitable values or characters may be used without departing from the scope of the present invention. These deactivation signals are transmitted as multi-frame control messages as discussed in more detail above in connection with FIG. 3. Thus, each of the five deactivation signals is transmitted through eight master sub-frames 302 in the exemplary embodiment.

The mobile unit 14 transitions to the idle state 502 after transmitting the last deactivation signal. Thus, if the base unit 12 receives any one of the deactivation signals, the base unit 12 can determine from the sequential value of the deactivation signal the remaining number of master sub-frames 302 that the mobile unit 14 will transmit before transitioning to the idle state 502. In this way, if even one of the deactivation signals is received by the base unit 12, the mobile unit 14 and the base unit 12 will transition from the active state 504 to the idle state 502 simultaneously.

While the invention has been particularly shown and described by the foregoing detailed description, it will be understood by those skilled in the art that various other changes in form and detail may be made without departing from the spirit and scope of the invention.

What is claimed is:

1. A method for wireless communication, comprising:
   communicating from a first unit to a second unit a plurality of transition signals, each of the transition signals having a sequential value; and
   transitioning the first unit and the second unit from a first state to a second state substantially simultaneously based on the sequential values of the transition signals by synchronizing a first frame counter of the first unit with a second frame counter of the second unit.

2. The method of claim 1, communicating from a first unit to a second unit a plurality of transition signals comprising communicating from a master to a slave a plurality of activation signals.

3. The method of claim 2, transitioning the first unit and the second unit from a first state to a second state simultaneously comprising transitioning the master and the slave from an idle state to an active state simultaneously.

4. The method of claim 3, the idle state comprising communication of control data for maintaining a synchronization between the master and the slave and the active state comprising communication of payload data between the master and the slave.

5. The method of claim 1, communicating from a first unit to a second unit a plurality of transition signals comprising communicating from a slave to a master a plurality of identification signals.

6. The method of claim 5, transitioning the first unit and the second unit from a first state to a second state simultaneously comprising transitioning the slave and the master from a synchronizing state to an idle state simultaneously.

7. The method of claim 6, the synchronizing state comprising negotiation of communication parameters between the master and the slave and the idle state comprising communication of control data for maintaining a synchronization between the master and the slave.

8. The method of claim 1, transitioning the first unit and the second unit from a first state to a second state simultaneously comprising synchronizing a frame counter for the first unit with a frame counter for the second unit.

9. The method of claim 1, wherein transitioning the first unit and the second unit from a first state to a second state comprises setting the first frame counter and the second frame counter to zero at essentially the same time.

10. A system for wireless communication, comprising:
    a first unit in a first state;
    a second unit in the first state, the second unit for wireless communication with the first unit;
    the first unit for communicating a plurality of transition signals to the second unit, each of the transition signals having a sequential value; and
    the first unit and the second unit operable to transition from the first state to a second state substantially simultaneously based on the sequential values of the transition signals by synchronizing a first frame counter of the first unit with a second frame counter of the second unit.

11. The system of claim 10, the first unit comprising a master, the second unit comprising a slave, and the transition signals comprising activation signals.

12. The system of claim 11, the first state comprising an idle state for communication of control data for maintaining a synchronization between the master and the slave and the second state comprising an active state for communication of payload data between the master and the slave.

13. The system of claim 10, the first unit comprising a slave, the second unit comprising a master, and the transition signals comprising identification signals.

14. The system of claim 13, the first state comprising a synchronizing state for negotiation of communication parameters between the master and the slave and the second state comprising an idle state for communication of control data for maintaining a synchronization between the master and the slave.

15. The system of claim 10, further comprising:
    a frame counter for the first unit;
    a frame counter for the second unit;
    the first unit and the second unit operable to synchronize the frame counters on transitioning from the first state to the second state simultaneously.

16. The system of claim 10, wherein the first unit and the second unit are operable to set the first frame counter and the second frame counter to zero at essentially the same time on transitioning from the first state to the second state simultaneously.

* * * * *